United States Patent
Horsburgh et al.

(10) Patent No.: US 10,855,492 B2
(45) Date of Patent: Dec. 1, 2020

(54) INTELLIGENT TACTICAL GATEWAY SYSTEM

(71) Applicant: TACTICAL COMMUNICATIONS GROUP, LLC, Tewksbury, MA (US)

(72) Inventors: Steven D. Horsburgh, Hudson, NH (US); Peter Ellis, Andover, MA (US)

(73) Assignee: TACTICAL COMMUNICATIONS GROUP, LLC, Tewksbury, MA (US)

( * ) Notice: Subject to any disclaimer, the term of this patent is extended or adjusted under 35 U.S.C. 154(b) by 0 days.

(21) Appl. No.: 16/516,682

(22) Filed: Jul. 19, 2019

(65) Prior Publication Data

US 2020/0028717 A1 Jan. 23, 2020

Related U.S. Application Data

(60) Provisional application No. 62/700,501, filed on Jul. 19, 2018.

(51) Int. Cl.
*H04L 12/66* (2006.01)
*H04L 12/58* (2006.01)

(52) U.S. Cl.
CPC ............ *H04L 12/66* (2013.01); *H04L 51/066* (2013.01); *H04L 51/18* (2013.01); *H04L 51/38* (2013.01)

(58) Field of Classification Search
None
See application file for complete search history.

(56) References Cited

U.S. PATENT DOCUMENTS

| | | | | |
|---|---|---|---|---|
| 6,212,550 B1* | 4/2001 | Segur | ................. | H04M 3/5307 379/88.14 |
| 6,466,971 B1* | 10/2002 | Humpleman | ....... | H04L 12/2803 709/203 |
| 2006/0167975 A1* | 7/2006 | Chan | ................. | H04L 67/2819 709/203 |
| 2008/0025230 A1* | 1/2008 | Patel | ................. | H04L 41/5022 370/252 |
| 2010/0254395 A1* | 10/2010 | Smith | ................. | H04L 12/66 370/401 |
| 2011/0103393 A1* | 5/2011 | Meier | ................. | H04W 28/08 370/401 |
| 2012/0140767 A1* | 6/2012 | Brothers | ............. | H04L 67/2823 370/352 |
| 2015/0082975 A1* | 3/2015 | Huber | ................. | F42C 17/04 89/1.11 |
| 2016/0191714 A1* | 6/2016 | Johan | ................. | H04M 11/04 370/354 |
| 2019/0340151 A1* | 11/2019 | Nguyen | ................. | H04L 51/36 |
| 2020/0053189 A1* | 2/2020 | Peng | ................. | H04L 69/08 |

* cited by examiner

*Primary Examiner* — Anh Vu H Ly
(74) *Attorney, Agent, or Firm* — Pearne & Gordon LLP (57) ABSTRACT

A system and method for an intelligent translation gateway for various networked combat environment is disclosed. The gateway is configured to aggregate messages, apply domain-specific intent translation, and thus control data flow based on situational awareness.

19 Claims, 6 Drawing Sheets

INTELLIGENT TACTICAL GATEWAY SYSTEM

CROSS-REFERENCE TO RELATED APPLICATIONS

The present application claims priority to U.S. Provisional Patent Application No. 62/700,501, entitled "INTELLIGENT TACTICAL GATEWAY SYSTEM" and filed on Jul. 19, 2018, the entirety of which is herein incorporated by reference.

BACKGROUND

Field of Invention

The present disclosure relates to tactical gateway systems, and more particularly to gateway systems and methods that enable intelligent translation between communication protocols/formats, particularly for networked combat environments including various tactical data links (TDLs).

Related Art

The military units of the United States and its allies, such as the North Atlantic Treaty Organization (NATO) and other allies, currently utilize many different TDL communication protocols and formats (the terms protocol and format being used interchangeably herein). For example military entities may use Link 16, Situation Awareness Data Link (SADL), Variable Message Format (VMF), Collaborative Electronic Support Measures Operations (CESMO), or Cursor on Target (CoT). However, there is no single standard TDL used by all entities. Accordingly, to effectively operate in modern networked combat environments utilizing these many different TDLs, mobile datalink gateways are used for the development and real-world operations of joint training and joint tactics, techniques and procedures (TTP). Proper communication between TDLs can reduce the risk of fratricide; decrease the risk to operations in a denied environment; ensure accurate and legitimate targeting; limit collateral damage; and expedite the kill chain for successful execution of fleeting engagement situations with a high-value target (HVT).

While current gateways exist for facilitating communication between different TDLs, these gateways only translate data from one format to another format. That is, they merely take data transmitted by a device configured to operate one TDL and translate it to a format understandable by a device configured to operate another TDL. But this is not sufficient because there may not be equivalent messages in each TDL, and the TDLs may have different technical requirements (e.g., transfer speeds, bandwidth limits, line of site or satellite connection requirements, and the like). These differences are important when operating in a military environment. For example, service members of the joint training or the joint TTP who direct the action of a combat aircraft engaged in close air support (CAS) and other offensive operations from a forward position, such as the forward air controllers (FACs) and joint tactical air controllers (JTACs), may use devices such as radios or like ground-based computers to communicate with the CAS aircraft, in order to send hostile coordinates and friendly locations to the pilot of the CAS aircraft in a carefully scripted sequence during the kill-chain process. Where the FAC and JTAC radios are configured to operate on one TDL (e.g., VMF) and the CAS aircraft is configured to operate on another TDL (e.g., Link 16), a gateway translates commands and information transmitted by the FAC/JTAC radio to the CAS aircraft, and vice versa. However, such translation does not account for differences in the types of commands and queries, and information transmitted over each TDL. For example, a request for operational information over a VMF TDL may be communicated to the gateway via a K01.3 query for K04.1 observation information or K05.1 position information. But as noted above because there is no standard specification, it may not be possible using current methods to accurately respond to the request when using multiple communication protocols.

Put simply, even when the commands, queries, and information from one protocol are translated into a readable manner for another protocol, those commands and the protocol-specific information must still then be understood by the end-user and translated into appropriate commands and information for their protocol. These problems can be exacerbated when the persons associated with each entity speak different languages because those people must be able to understand the commands and the language associated with the other communication protocol.

Further, existing data link gateways have the tendency to flood lower-speed, lower-capacity data links when routing data from higher-speed, higher-capacity data links. The existing military standards address the lowest common denominator data format translation mechanics, but they leave the capacity, speed, latency, and tactics up to individual message level implementations satisfied by the data formats used in the existing data link gateways. Where control of data flow has been left to individuals rather than technical gateways, those individuals may not be fully educated on each protocol used in a communication sequence and are subject to slow speed and errors.

BRIEF SUMMARY

As noted above, various TDL protocols do not necessarily have equivalent or corresponding commands/queries and information requirements for transmitted messages and may have different technical requirements. Accordingly, it is not always possible to directly translate messages in one format to another. The present disclosure relates to a gateway that is intelligent to identify and relate the commands/queries of one format to those of another, and transmit data accordingly so that communication between two unlike TDL protocols remains coherent and understandable for the end users. Still further, this processing and data flow can be used to optimize the technical requirements for processing data associated with each protocol. In contrast, conventional gateways are only capable of providing direct translations.

In view of this, according to various embodiments of the gateway described herein, unattended, automatic data translation in an operational environment is enabled by continuously monitoring multiple digital data streams and, using existing Tactics, Training, and Procedures (TTPs) as a guide, providing real-time cross-domain information to network participants using existing protocols and sequences. Further, the gateway can act as an autonomous intelligent translator by collecting information from TDL protocols such as Link 16 and VMF networks and providing appropriate feedback during the mission flow. This may be done in accordance with the VMF digitally-aided CAS (DACAS) CI.

Still further, the gateway may intelligently limit data streams therethrough to only data necessary for conducting a given current mission. In view of this, effectively or substantially simultaneous transmission of data and voice communication can be controlled to prevent noisy or corrupted transmission of one or both of the data and voice. This may be accomplished by filtering (message type, geographic area, recurrence rate), metering (setting the transmission rate based on the speed of the data link the data is being transmitted on to), and/or grouping (aggregation of messages into an internal common database updated when data is received, but only transmitted when complete information is available, typically from multiple incoming messages) data transmissions.

Still further, the gateway may implement a request-response mechanism that allows an operator to digitally request information transmissions from the gateway, thereby minimizing data traffic while giving the operators, who are external to the gateway, control of how much or little data they see, and when these transmissions should occur. Here "external" refers to operators that are not intended to be part of the communications network when the network was been configured, such as unplanned operators. In other words, the gateway allows for the addition of ad-hoc users.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

In view of the foregoing problems, there is a need for an intelligent translation gateway for networked combat environment. In particular, the gateway described herein is capable of both: 1) translating information between TDL protocols; and 2) controlling information flow based on the content of the information. More particularly, the gateway of the present disclosure overcomes the limitations of current data link gateways by aggregating messages, applying domain-specific intent translation, and adding the ability for situational awareness query/response for assets entering a specific geographic area, by providing the data format translation mechanics and solving the speed, capacity, and usability issues. Such an intelligent gateway system of the present disclosure allows JTACs to efficiently and effectively communicate and carry out their operations in a multi-TDL network (e.g., one that supports multiple TDLs such as the Link 16, Situation Awareness Data Link (SADL), Variable Message Format (VMF), Collaborative Electronic Support Measures Operations (CESMO), Cursor on Target (CoT), and other data exchange formats) between the members of user communities such as the ground forces, aircraft, and command and control (C2) elements.

Figure 1:
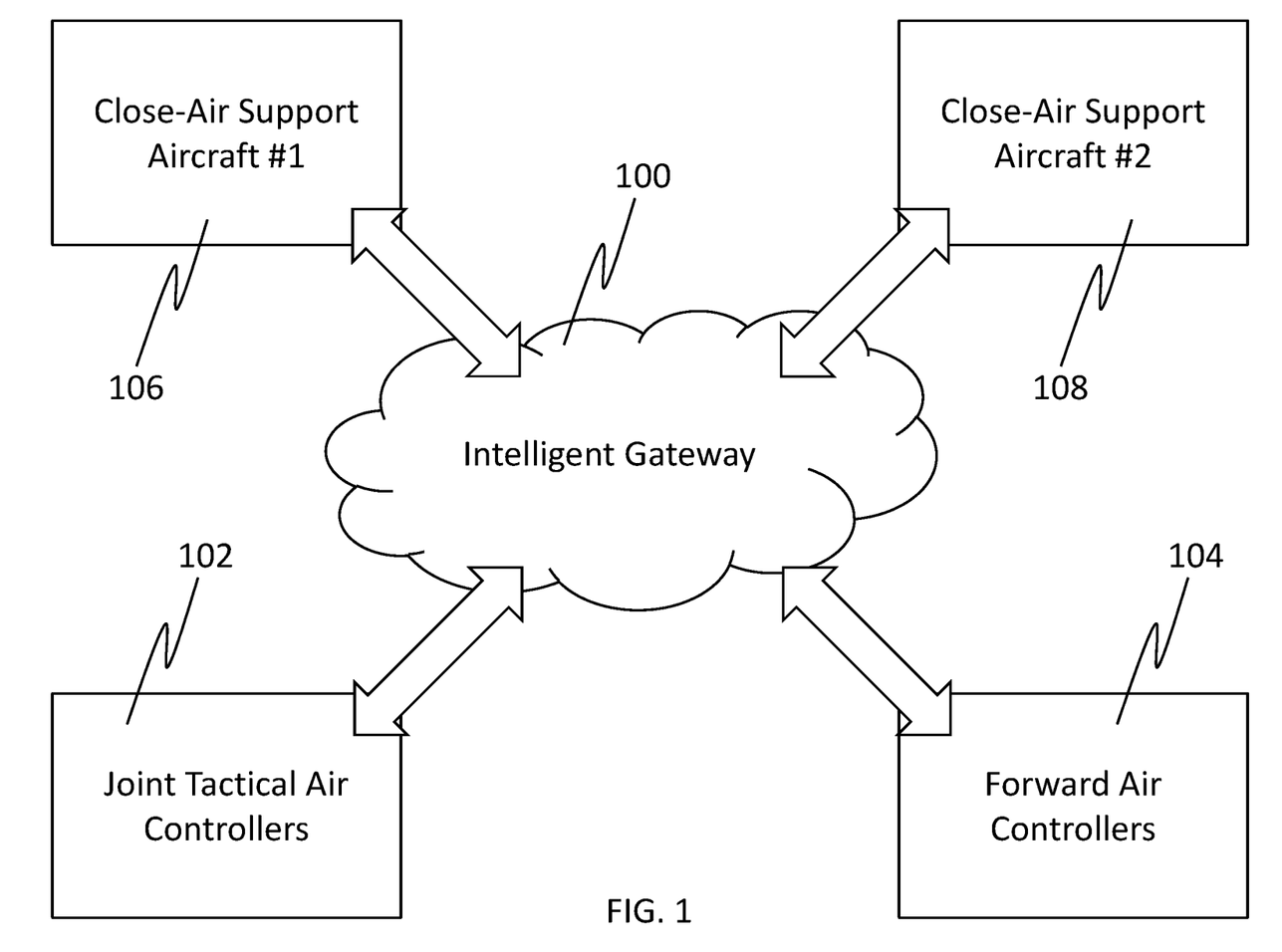
FIG. 1 illustrates an example communication architecture for the gateway in accordance with some embodiments of the disclosure.

As illustrated in FIG. 1, the gateway 100 serves as a central communication hub between various military entities, such as JTACs 102, FACs 104, and air support aircraft 106, 108, such that communication and information transmission between the entities is routed through the intelligent gateway 100. As noted above, any or all of these entities may have communication hardware (e.g., radios and computers) configured to operate according to a different TDL protocol, or some entities may be configured to operate according to a common protocol. Still further, it is possible that the people associated with entity 102-108 may be from different countries and thus speak different languages.

Figure 2:
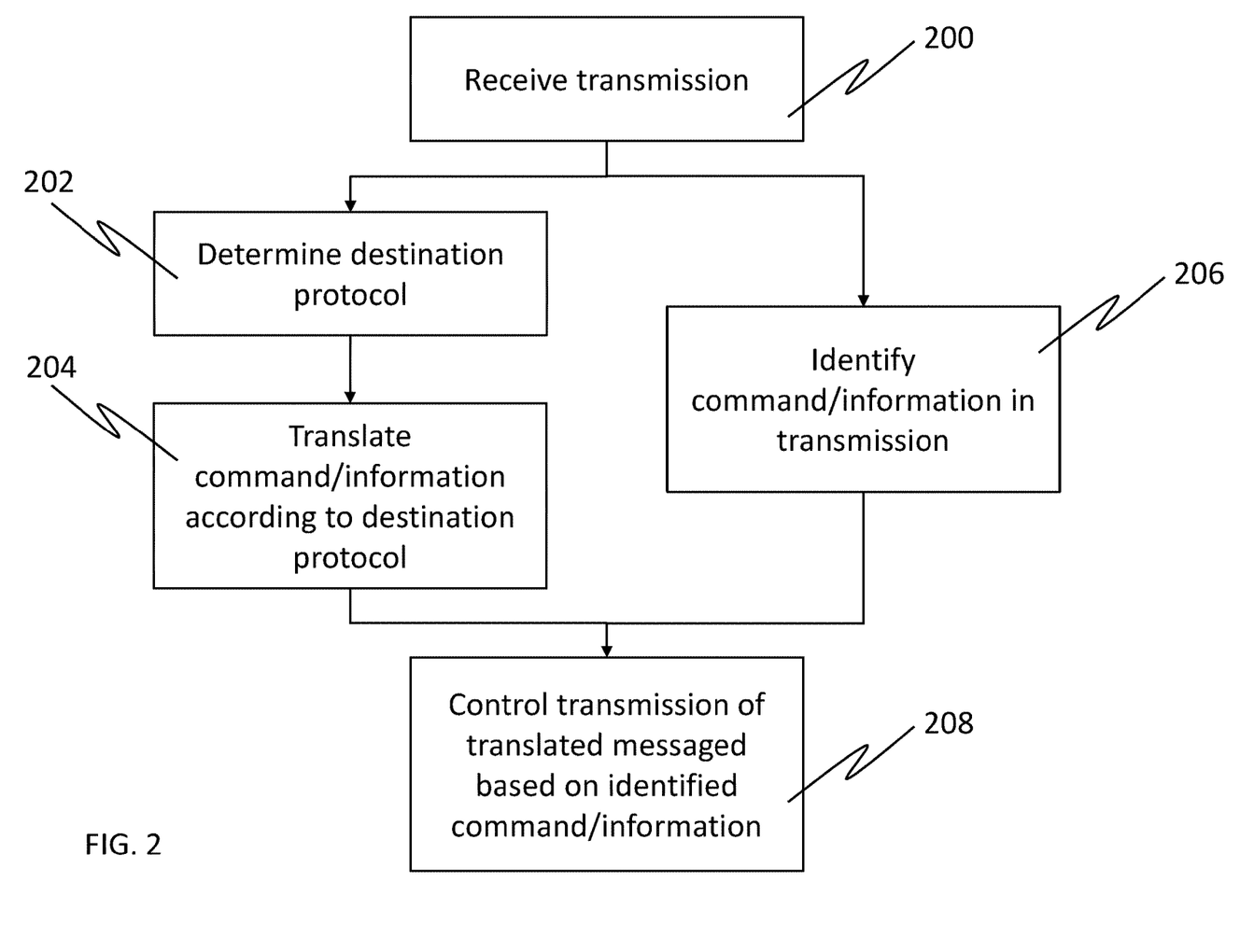
FIG. 2 illustrates an example process flow of a gateway in accordance with some embodiments of the disclosure.

With reference to FIG. 2, the processing flow of the intelligent gateway 100 is briefly illustrated. Therein, the gateway 100 first receives a transmission 200 in one of the TDL formats from one of the military entities 102-108. The format of the transmission destination is then determined 202. This would correspond to a destination of the entity (or entities) 102-108 to which the transmission is destined. For example, when a JTAC 102 transmits a message in VMF to the first air support aircraft 106 using Link 16, the intelligent gateway 100 receives the VMF transmission from the JTAC and identifies Link 16 as the destination TDL. The message transmitted by the JTAC can then be translated 204 to the Link 16 format for the air support aircraft 106 to understand. Additionally, the intelligent gateway 100 identifies 206 the command (or query) of the transmission and any associated information. Based on this identification, the intelligent gateway may determine whether to process the information for future transmissions, hold the message for a future transmission, immediately forward all or part of the translated message, or otherwise control output of the translated message 208. These determinations may be guided, for example, by military standards including but not limited to, JPub 3-09.3, MIL-STD-6020, MIL-STD-6016, MIL-STD-6017, and other TDL-related military standards, stored in look-up tables. Of course, it should be appreciated that this determination may occur for the data in any format, such that the received transmission need not necessarily be translated (and the destination format need not necessarily be determined) in order to identify the commands and information in the message. Such identification may also be performed with the message in a normalized format. In other words, steps 202-206 may be performed in any sequence or simultaneously.

Figure 3:
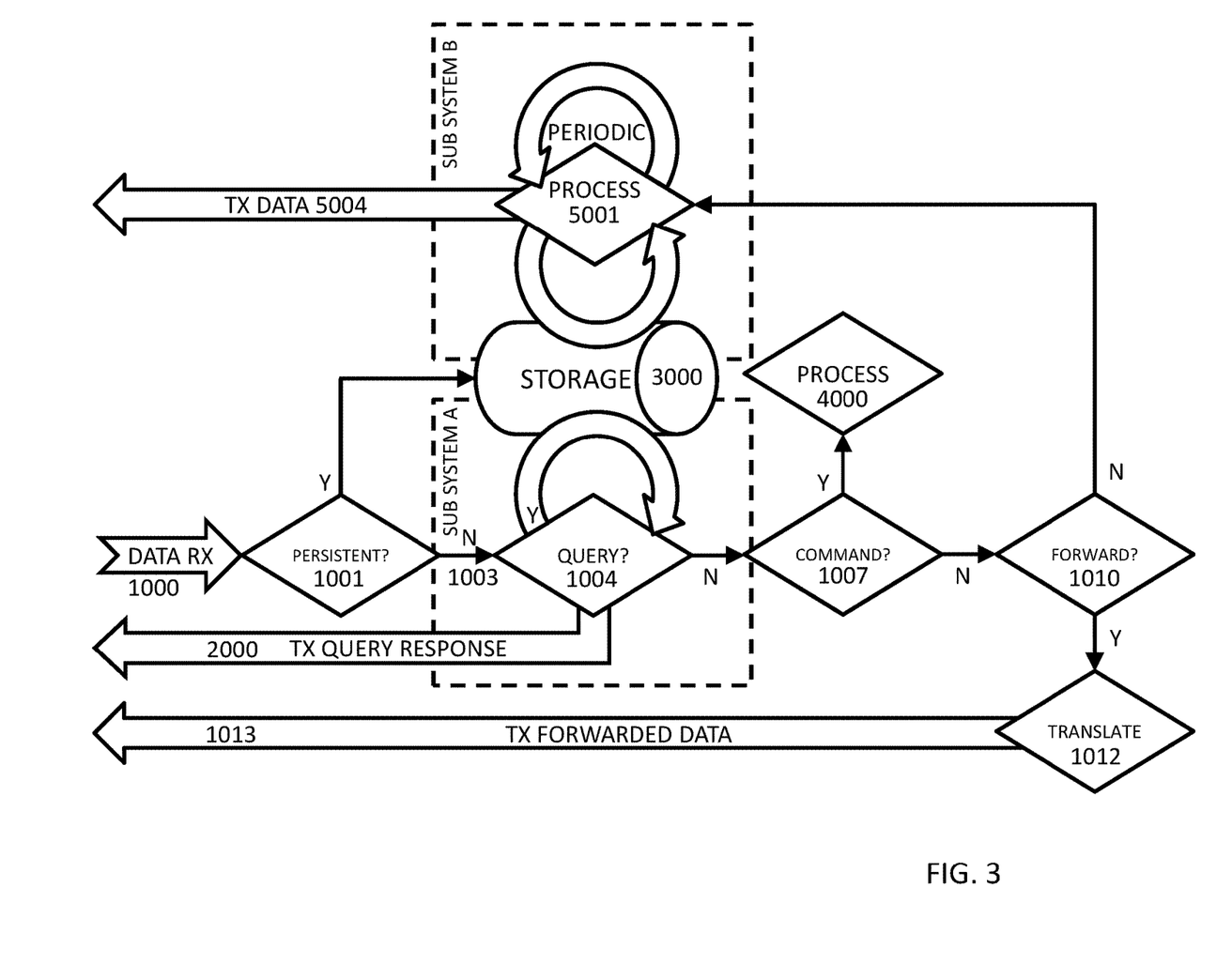
FIG. 3 illustrates an example internal processing of the gateway in accordance with some embodiments of the disclosure.

In more detail, referring to FIG. 3, data 1000 (e.g., packets of data received by gateway of the present disclosure from one of the military entities) initially received by the gateway may be normalized to a common message format and tagged with information about the source of the data 1000 and the message originator of the data 1000, as well as information about specific destination or desired recipient information. Next, any information in the message contained in data 1000 that is to be persistently maintained is determined 1001 and stored in a runtime storage 3000. Following the initial processing, the data 1000 enters SUBSYSTEM A and is subjected to a series of checks, including identifying whether the message is a query 1004 (and what the query is). If the data 1000 is not a query, then it is determined whether the data 1000 is a command 1007 and whether the message has a military standard forwarding pathway defined.

If the data 1000 is identified as a query in SUBSYSTEM A, any information needed to answer the query is retrieved from the storage 3000. The response may then be transmitted 2000. The information retrieved from storage may be from previously received data 1000, particularly from another TDL format. Where the data 1000 contains a command, such as an external message directed to the system in order to affect a configuration or control change, the command can be executed 4000 by a processor of the gateway 100. Where data 1000 identifies a defined and configured forwarding pathway 1013, the gateway 100 determines whether the message in data 1000 meets the criteria based on information content of the defined forwarding processing. If the criteria are met—where no additional processing is needed, for example, because there is an equivalent message in the other TDL such that a simple translation can be performed and the translated message can be understood by the other entity—the message is duplicated and passed to the message translator 1012 to be translated and forwarded to the recipient entity.

Considering the above, SUBSYSTEM A provides a mechanism by which an external system may use existing data pathways to supply specific or specially-formatted messages to request information about data obtained from other network sources, or even information about status or performance of the processing modules themselves.

Figure 4:
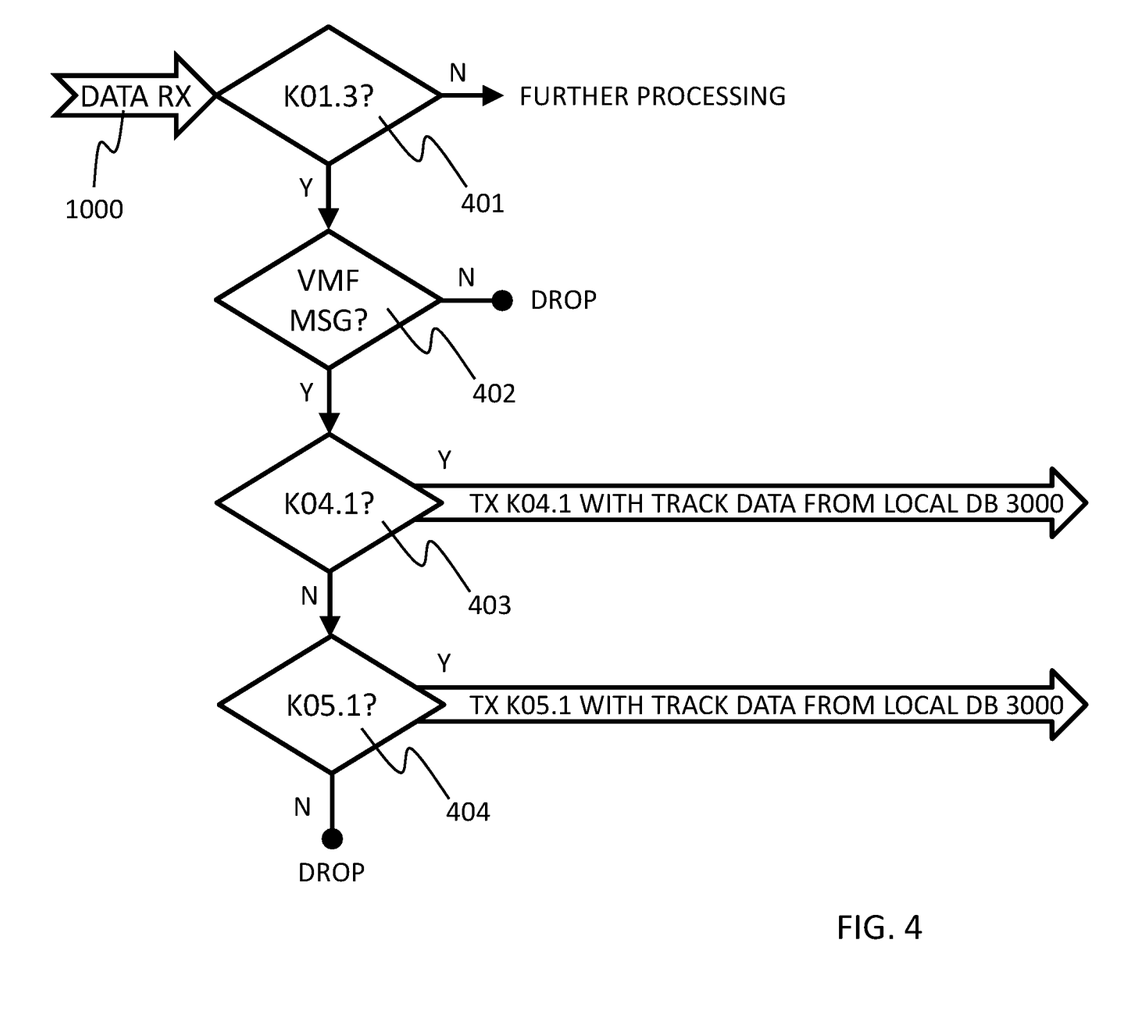
FIG. 4 illustrates an example internal processing of Subsystem A of the gateway in accordance with some embodiments of the disclosure.

An example of the processing described above to determine whether data 1000 includes a query, as part of SUBSYSTEM A, is illustrated in FIG. 4. Of course it should be appreciated that similar processes for different types of messages are also envisioned within the scope of the present disclosure. According to the example therein, data 1000 is first checked to determine whether the incoming message contained in data 1000 is a VMF K01.3 Information Request message (STEP 401). This message may request a response of hostile, unknown, pending, or friendly track and asset information from the addressee. Also contained in the message may be an area of interest—a geographic location specified by latitude and longitude coordinates and either a range/bearing (for circular areas) or another set of latitude and longitude coordinates (for rectangular areas). If the incoming data message 1003 is not a K01.3 message, it is processed further to determine the type of message. If it is a K01.3 message, in one or more embodiments, the gateway of the present disclosure may first determine whether this is a request for a VMF message (STEP 402). If not, the message can be dropped. If it is a request for a VMF message, SUBSYSTEM A may then further determine if the message is a request for VMF Message of type K04.1 (STEP 403) and/or K05.1 (STEP 404). If a K04.1 Intelligence Operations functional area Position Report message (for hostile, unknown, or pending tagged data) is requested, in one or more embodiments, the gateway may then obtain the respective current persistently stored data corresponding to the area of interest from the storage 3000 and populate a K04.1 response to send back to the originator of the K01.3 as part of a transmission query response 2000. If a K05.1 Land Combat Operations functional area Position Report message is requested (for friendly target data), in one or more embodiments, the gateway may obtain the respective current persistently stored data corresponding to the area of regard from the storage 3000 and populate a K05.1 response to send back to the originator of the K01.3 as part of the transmission query response 2000.

Figure 5:
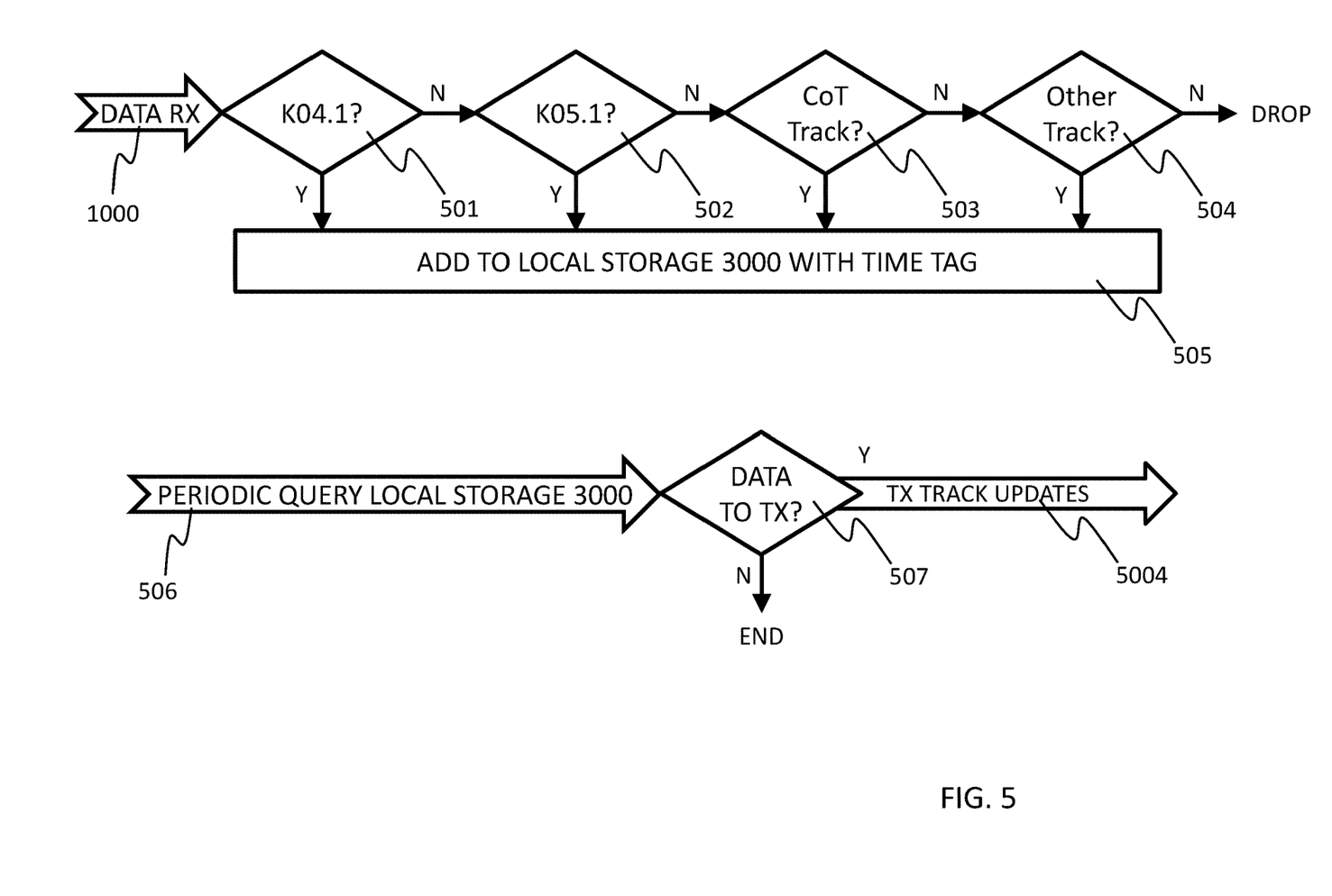
FIG. 5 illustrates an example internal processing of Subsystem B of the gateway in accordance with some embodiments of the disclosure.

Referring back to FIG. 3 and to FIG. 5, if the data 1000 does not have a defined forwarding pathway 1013, it is passed to SUBSYSTEM B. There, the data 1000 is periodically processed with reference to information stored in the storage 3000. For example, the data 1000 may be processed to determine whether it relates to a K04.1 message (step 501), a K05.1 message (step 502), cursor on target (CoT) tracking information (step 503), or some other tracking information (step 504), all of which are stored 505 in storage 3000. Of course, other types of information may also be stored 505. If the data 1000 is not the type to be stored 505, then it may be dropped. In addition to processing incoming data 1000, SUBSYSTEM B also periodically queries the local storage 506 for stored information that is appropriate to transmit at the time of the storage query 506, but would not have been appropriate to transmit at the time of storage. If the data queried from the storage 506 is appropriate to transmit 507, the queried data is translated for the other TDL protocol and transmitted 5004 to the destination entity.

The processing and decision to transmit 5004 to the destination is intended to make intelligent situational decisions based on a number of factors, including configuration parameters, processing states, message source, message destination, and presence or absence of other mission details. Put another way, SUBSYSTEM B processes dissimilar data inputs, not otherwise capable of being forwarded via conventional means, by aggregating and analyzing them to generate output data 5004 according to a set of rules and subsequently trigger automatic situationally-appropriate mission-aware messages. Such dissimilar data may be the result of different types of commands and information used by different TDL protocol formats.

In some embodiments, transmission of output data 5004 may be initiated by a number of events. For example, incoming packets of data 1000 to SUBSYSTEM B may initiate a single-or-multiple-transmission sequence depending on the current processing state or presence or absence of other data packets in the sequence or in persistent storage 3000. Periodic processing timers may cause evaluation or re-evaluation of the current state which may trigger an arbitrary number of transmissions or transmission sequences of output data 5004.

Figure 6:
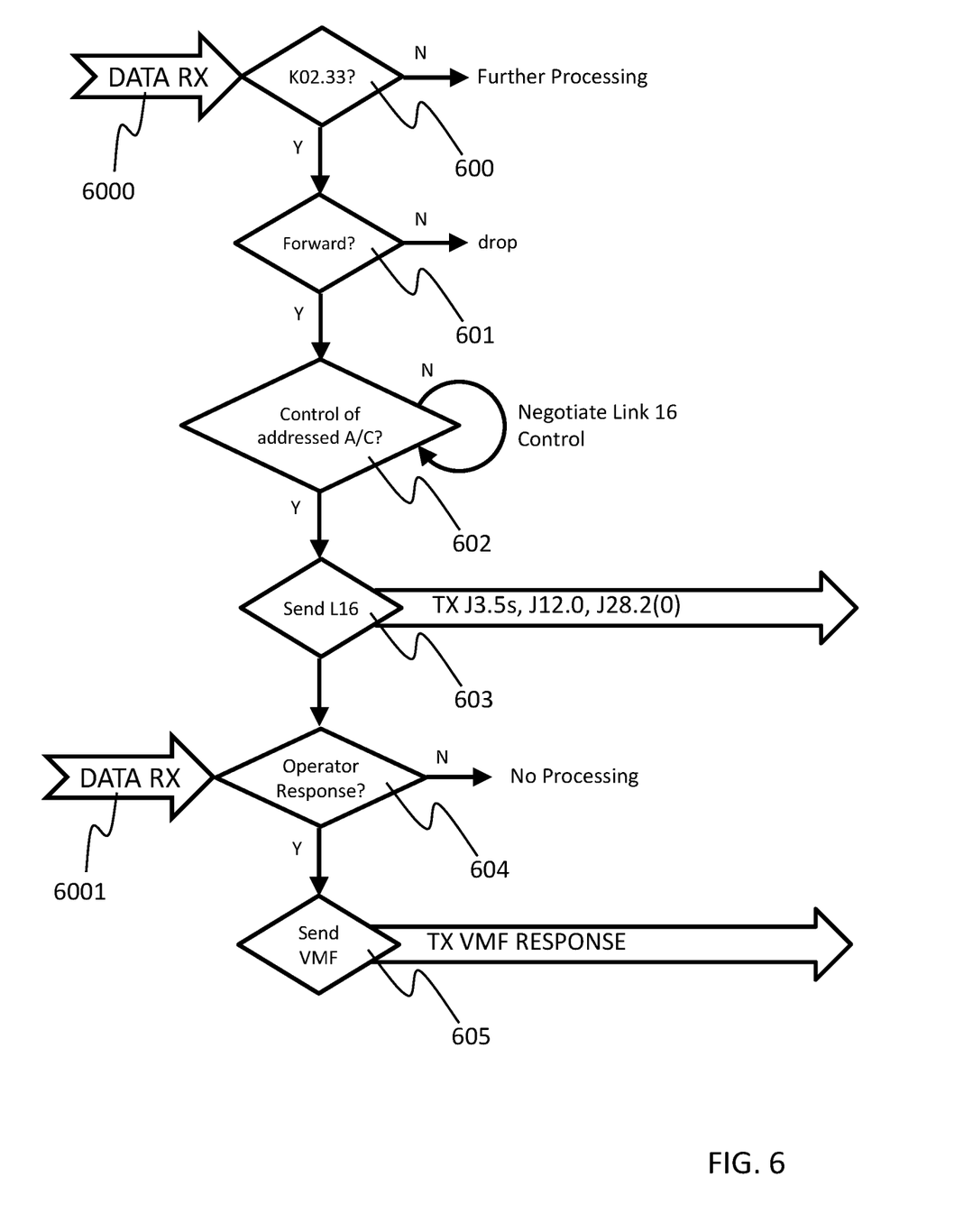
FIG. 6 illustrates an example input-output overview of the gateway in accordance with some embodiments of the disclosure.

An example operation of the gateway according to the above is further illustrated with respect to FIG. 6. Therein, an example data flow between two entities (e.g., a JTAC and air support aircraft) is shown. According to this example, data is initially received 6000 at the gateway from a JTAC land unit. If the gateway determines 600 the data 6000 is CAS brief to the air support aircraft transmitted via VMF as a K02.33 message, the gateway negotiates Link 16 control of the air support aircraft 602, for example, with a J12.4 message. Otherwise, the data 6000 is further processed to determine the type of message. Once negotiated, the gateway then transmits appropriate Link 16 messages 603 (corresponding to data transmission 5004 as shown in FIG. 3) associated with the information in the K02.33 CAS brief received from the JTAC. These messages can include a J3.5 friendly or target identification, or enemy air defense information, a J12.0 mission assignment (identifying an attack target), a J28.2(0) remarks and restrictions, or the like. After transmitting the Link 16 messages, data may be received 6001 in Link 16 format from the pilot of the air support aircraft. This data 6001 may be a Link 16 J12.0 WILCO/CANTCO response. If the data 6001 is identified as such (an operator response) 604, the pilot's message is translated to a VMF format (e.g., with a MIL-STD 2045-47001 VMF header) and transmitted 605 (corresponding to data transmission 5004 as shown in FIG. 3) to the JTAC land unit.

Here it is noted that the initial incoming data 6000 VMF message from the JTAC land unit cannot necessarily be simply translated and transmitted to the air support aircraft according to the Link 16 protocol. This is because, as shown in FIG. 6, the VMF message in the context of the entire communication sequence additionally needs negotiated control of the aircraft, and the information therein may not correspond to a single Link 16 message. The gateway of the present disclosure is thus able to interpret the practical meaning of the K02.33 message to perform the additionally needed tasks, and aggregate or distribute the information into appropriate messages of the Link 16 (or other) transmission protocol.

Of course other messages may be transmitted through the gateway in accordance with the above examples. Further, the example of FIG. 6 is not limited to just those messages discussed above, and may further process messages that rely on persistent or periodical storage, response to queries, and other processing steps discussed above.

A discussion of more specific examples of messages and their particular processing that may be performed by the gateway 100 described herein follows.

Link 16 Data Flow

In one or more embodiments, the gateway of the present disclosure serves as a C2 node negotiating CAS activities. For example, when a VMF-equipped JTAC sends a K02.33 Close Air Support Aircrew Briefing message to a Link 16 equipped aircraft to initiate a mission, some embodiments of the gateway may attempt to take control of the supporting asset by issuing an original order (Receipt Compliance required) such as the J12.4 Controlling Unit Change order to the CAS aircraft associated with the mission.

Alternatively, in some embodiments, the gateway may attempt to negotiate control with the supporting asset's existing C2 unit via J10.3 Handover. Whether the aircraft is contacted directly by the gateway control is negotiated with the aircraft's existing C2 unit (via J10.3) and is configurable on a mission-by-mission basis. Optionally, in some embodiments, the gateway may alert the JTAC operator and take control of the asset and issue periodic J10.5 Maintain Control messages. These assets and the desired control channel may be determined and assigned prior to initiation of the mission or during live exercises but not without prior coordination.

In some embodiments, the gateway of the present disclosure allows the specific CAS aircraft to have already been identified or identified by another C2 node prior to mission initiation. In some embodiments, once the controlling unit negotiation has taken place, the gateway of the present disclosure may publish J3.5 messages to pass along the friendly and hostile locations from the K02.33 message and subsequently issue a J12.0 Mission Assignment Designator (MAD) Attack or MAD Laser depending on the asset type, available stores, and weapon selection from the JTAC. The operator (the aircraft or the controlling unit) response can then be relayed to the JTAC. In some embodiments, the gateway may monitor the J12.6 messages as the target is prosecuted, sending J10.2 messages to the rest of the Link 16 network as necessary.

In some embodiments, once battle damage assessment (BDA) has been accomplished, either by the JTAC via K02.28 Close Air Support Mission Battle Damage Assessment (CASBDA) Report or by the aircraft by one of the BDA Status Information Discrete (SIDs) in the J12.6 (6, 8, 11 or 12), the mission is terminated and all associated J3.5 tracks are dropped.

VMF Data Flow

According to one example, when a JTAC has "checked in" with the gateway by either a VMF K01.1 Free Text message or via a K-message that allows JTAC and mission identification (such as the K05.1 Position Report, K02.33 Close Air Support Aircrew Briefing, etc.), some embodiments of the gateway may automatically transmit a K02.34, On Station Report (OSR) for the assigned CAS aircraft. In some embodiments, if the aircraft has not yet joined a local Link 16 network, the gateway may inform the JTAC that it will provide the K02.34 OSR once the aircraft has been seen on the network.

In some embodiments, the gateway maintains, in the persistent storage 3000, the information from J2.2 Air PPLI message (the aircraft's precise participant location and identification, or PPLI) and from J13.2 Air Platform and System Status message (platform status) contained in data 1000 so that when a check-in occurs, this information may be sent immediately.

The VMF K02.33 Close Air Support Aircrew Briefing message is a Nine Line message that has no counterpart in other TDLs. The algorithms to convert a K02.33 (and associated situational updates) are unique to the gateway of the present disclosure. For example, in one or more embodiments, the J12.0 messages are only generated when needed during the DACAS mission flow and only in specific scenarios. The gateway may determine what type of J12.0 message (there are many different types of J12.0 messages) to send and in what sequence. Details of the transmission rules and acknowledgement or response sequences are intended to be in compliance with what are specified in the appropriate data link MIL-STDs, and embodiments of the gateway of the present disclosure are equipped with the appropriate rules and algorithms embedded therein.

For example, in one or more embodiments, the basic requirement may be to generate mission control messages such as the J12.0 Mission Assignment messages, which are C2 Mission Assignments (MAs) used for CAS tasking. There may also be friendly tracks (translated to multiple J3.5 Land Point/Track messages) for the nearest friendlies; hostile or target tracks (translated to multiple J3.5 messages); control points, contact points, and initial points (translated to multiple J7.3 Pointer messages); enemy air defense locations and descriptions (translated to multiple J3.5 messages); textual information (translated into multiple J28.2 messages); and other information that has no translation rules that the gateway reformats into multiple J28.2 messages. For instance, in one or more embodiments, since there is minimal data that is directly translatable from one data link into another data link, a built-in set of rules may be employed that extracts the most amount of received information to be sent from one data link to another. Conventional gateways often ignore this "non-translatable" data. In the gateway of the present disclosure, one or more embodiments instead take that data and convert it into a textual string that is human readable. Some of the track information may be sent prior to or after reception of the K02.33. In some embodiments, the gateway of the present disclosure uses its persistent storage 3000 to "fill-in" the missing data required for Link 16 and sends updates to messages when additional data 1000 is received during a mission. For example, some data fields in a specific TDL message may be required, where such fields may not be identical or similar across different data links. To fill in this required data, in one or more embodiments, canned, preconfigured values may be employed. Preferably, in other embodiments, extrapolation of previously received (recent) data from other messages may be used to fill in the required fields. In some embodiments, during the mission execution, the gateway may handle the periodic reporting required to ensure the appropriate tracks are not staled out or dropped.

The final part of the K02.33 message intent is to task the Link 16 aircraft with prosecuting the target. In some embodiments, the gateway may send one or more J12.0 MAs (MAD Attack or Laser with follow-on supplemental J12.0 with laser codes as needed). However, this J12.0 message will be rejected by some platforms if the gateway is not their controlling unit. In this case, some embodiments of the gateway will auto-negotiate control of the platform (using the appropriate sequences of J12.4 and J10.5 messages) once the aircraft check-in occurs and drop control after the mission is complete, all the while sending J10.2 messages for the engagement progress on Link 16. For example, on Link 16, there is a very specific set of rules defined in the MIL-STD with regards to the sequence of "mission entering, mission control, mission assignment, mission prosecution, and mission exiting." However, not all Link 16 platforms may strictly abide by the rules, and in practice, the gateway of the present disclosure is able to adapt accordingly. For example, the standard CAS control sequence may be as follows:

1. Ground operator identifies need for an airstrike on a target.
2. Ground operator contacts a command and control unit and requests a strike.
3. C2 unit determines which aircraft is appropriate and informs both the ground and air operator that the mission is going to be assigned.
4. If there is no aircraft controlled by the C2 unit, the C2 unit will contact other C2 units and ask permission to control one of the other C2's aircraft. If accepted, control is temporarily transferred from the other C2 to the original C2 (this involves multiple J messages).
5. Once the C2 has (or obtains) control of the aircraft, it can either issue a mission assignment (J12.0) to the aircraft to prosecute a target or transfer control to the ground unit for the ground unit to issue control commands.
6. If the pilot agrees, the mission proceeds and the C2 unit informs the ground unit (or the ground unit informs the C2 unit) that the mission will take place.
7. During the mission, periodic status messages and other J messages are transmitted and received by the ground unit, C2 unit, and aircraft.
8. Once the target prosecution has been completed, control of the aircraft is returned to the original controller ("dropping control").

The above sequence of events is significantly simplified for illustrative purposes, with many possible intermediate steps omitted; and the number of steps would increase rapidly if any of the units are on different data links. Conventional gateways are unable to handle the mission prosecution as illustratively described above, for example, when the ground operator and the aircraft operate on different TDLs, and thus instead may simply rely on voice communications between the parties, leading to inefficient, slow, and possibly erroneous mission prosecution. The gateway of the present disclosure, however, handles the above process in the following manner.

The VMF K02.35 Aircraft Depart Initial Point message can be sent by the gateway to the JTAC when the Link 16 aircraft has left the initial point area. However, while this is specified in the standards (e.g., for Link 16, MIL-STD), some embodiments of the gateway may disable such transmission since it has no mission value on a multi-link environment.

The VMF K02.59 Request for K02.57 Aircraft Attack Position and Target Destination (APTD) message may be received and processed by some embodiments of the gateway of the present disclosure. In some embodiments, no translation of this message is sent on the Link 16 network. Instead, in some embodiments, the gateway may use its persistently stored data in storage 3000, which has been obtained from prior reception of J2.2 Air PPLI and J12.6 Target Sorting messages and will create K02.57 APTD messages for transmission to the JTAC. In some embodiments, the gateway also handles any periodic reporting requests from the JTAC using dynamically updated data.

Once a mission has been prosecuted, either (or both) the JTAC or aircraft may send a Battle Damage Assessment (BDA). The JTAC may send a K02.28 CASBDA Report message or the aircraft may send a J10.2 Engagement Status with a BDA SID. When the K02.28 CASBDA Report is received, some embodiments of the gateway will send a J10.2 message to allow the mission to be cleared on the Link 16 network. When a J12.6 message with a BDA SID is received, some embodiments of the gateway will generate a K01.1 Free Text message to send to the JTAC, indicating the BDA state.

Link 16 Receive Message Processing

In accordance with one or more embodiments of the gateway of the present disclosure, all transmissions may be gated by VMF network activities during a DACAS mission. For example, Link 16 data transmission rates are significantly faster and have a higher capacity than VMF. The MIL-STDs state that when a piece of Link 16 data is received by a gateway and it can be translated, it should be translated and transmitted immediately. However, practically, this is oftentimes untenable because, for example, Link 16 data would quickly overwhelm the VMF network and render the radios unusable for voice communications. By inserting the gateway of the present disclosure between Link 16 and VMF communications it is possible to solve such problem by creating an "operational picture" or database of data that is updated when data is received from either Link 16 or VMF. This database is queried when necessary to send data to VMF participants when needed, and not otherwise. As a result, there may be no direct Link 16 to VMF translations as with conventional gateways. All information received on Link 16 is stored for use at a later time. This solves the problem that may arise from incompatible data link speed and capacity constraints.

The following messages are utilized by the processing of SUBSYSTEM B of one or more embodiments of the gateway. For each message, one or more embodiments of the gateway of the present disclosure stores (in storage 3000) all of the information necessary for translation. In contrast to existing gateways, the data stored and the processing performed by one or more embodiments of the gateway of the present disclosure is a superset of information processing specified in the standards documents. For example, the MIL-STDs only specify 3 VMF messages to translate to Link 16 (and vice versa) and rely on voice communication for the remainder of the data. In contrast, in one or more embodiments herein the gateway of the present disclosure processes multiple VMF and Link 16 messages. These messages include:

J2.2, J2.3, J2.4, J2.5, J2.6—Precise Position Location Information (PPLI)

Validate and store track number, environment category, position, course, speed, platform, identity, position quality, flight leader indicator, and call sign.

J13.2, J13.3, J13.4, J13.5—Platform status

Validate and store fuel and weapons stores, if defined, for PPLI referenced in the message.

J10.5—Controlling unit report

Validate and store controlling unit data for PPLI referenced in the message.

J12.6—Target sorting

Validate and store target information, weapon type, dive angle for PPLI sending the message. Target sorting SID field conveys meaning of the message. If a mission is not in progress, the target sorting message would have no effect other than to update the activity status of a PPLI, but when a PPLI involved in a DACAS mission sends certain target sorting messages, the state of the mission may change based on the SID value and current state of the mission. Once the mission has been initiated by the JTAC and accepted by the Link 16 entity, the Link 16 network (e.g., including an aircraft fighter, helicopter, or UAV (drone)) automatically sends target sorting messages with a status of "lock on, primary designated target" (SID 10). Receipt of this message at the gateway may cause a VMF message to be sent to the JTAC in a K01.1 Free Text message stating "ATTACKING." A "weapon released, missile in flight" status (SID 3) causes a "MISSILE IN FLIGHT" message to be sent to the JTAC. Once the attack is complete, the Link 16 system may optionally send a Battle Damage Assessment (BDA) report via SID 6 (target destroyed), SID 8 (target partially destroyed), or SID 11 (not effective). These messages may terminate and reset the DACAS mission processing and send a K02.28 message to the JTAC containing the appropriate assessment value for the attack.

J12.0—Mission assignment

If the command type is a response, store the response value. Responses to commands will come back with a receipt compliance value of WILCO, CANTCO, or HAVCO. Command rejections will come as CANTPRO for various reasons. MACHINE RECEIPT messages are used to determine that the message did in fact reach its destination.

VMF Receive Message Processing

K01.1—Free Text

In general, this message is handled as an addressed message and forwarded according to DACAS ECP #11 (MIL-STD 6020) processing rules. However, the DACAS CI uses a non-addressed (broadcast) free text message as an address-learning mechanism for JTAC/CAS aircraft digital coordination.

In some embodiments, processing in SUBSYSTEM B of the gateway uses a K01.1 Free Text message, when addressed to the local VMF URN, to initiate mission processing for a pending mission. Once the mission is initiated, the following actions may be performed:

1. Check for an active PPLI in the Link 16 network. If there is no active unit (active according to Link 16 based on minimum reporting interval), reply with free text to JTAC, advising them that no unit has been found yet.

2. Once the paired Link 16 platform is found to be active, the system checks to see if the platform is already under Link 16 control. If not, the gateway checks to see if any other C2 asset is currently reporting control of it via J10.5 messages. If there is no controlling unit, the gateway may request control by sending a J12.4 controlling unit change order directly to the platform. This message must be acknowledged by the pilot via WILCO or CANTCO. If the response is WILCO, the system may initiate control via J10.5 messages for the duration of the mission. If the platform is already under control from another C2 unit, the system may automatically negotiate transfer of control to the local unit from the controlling unit via J12.4 and J10.3 messages.

3. Once the Link 16 unit is under Link 16 control or if it was already under control, stored platform information may be used to populate the VMF K02.34 Aircraft On-Station report.

K02.33—Nine Line

A nine line can be sent by the JTAC for whom a mission has been configured at any time during execution of a mission to start or restart the DACAS CI sequence. In some embodiments, upon receipt of a nine line from a JTAC, the gateway's SUBSYSTEM B processing may perform the following actions:

1. If the mission was not started, perform the mission initiation procedure listed in the K01.1 section.

2. If the mission was previously in progress but not completed, close out the previous mission and drop any tracks previously generated.

3. Check the message for validity according to DACAS CI ECP #1 and #2. At a minimum, the mission number, request number, target location, and friendly location blocks must be defined and appropriately populated.

4. Store location information for each target and friendly unit positions, creating a J3.5 Land Point/Track message on Link 16 for each target with an identifying track number from the next available number in the JTAC's assigned Link 16 track block (or that assigned to the local system if no other alternative).

5. Send J12.0 Mission Assignment message to Link 16 unit with a MAD of "attack" (MAD 41) or "laser designator" (MAD 18), depending on the nine line targeting information. The target in each case corresponds to the target track number identified in the previous step. In the case of MAD 18, the laser code is sent in a supplemental data portion of a second J12.0.

6. Wait for operator response, mapping the specific response back into a VMF header that is paired to the original nine line request.

K02.59—Request for Aircraft Position and Target Designation (APTD)

This message can be sent at any time during a mission to obtain the position and targeting information for the paired Link 16 aircraft. In some embodiments of the gateway of the present disclosure, when this message is received, the following steps may be followed:

1. Validate the message according to DACAS CI ECP #1 and #2

2. Respond with a K02.57 APTD message according to the parameters in the request. The information in the APTD is obtained by continuous monitoring of the Link 16 PPLI, platform status, and target sorting messages associated with the Link 16 platform.

K02.58—Battle Damage Assessment (BDA)

This message can be sent at any time during a mission to terminate and restart the mission. In some embodiments, if the BDA indicates "target destroyed" then a J12.0 cease mission command (MAD 63) is sent to the Link 16 platform to terminate the mission. The mission results are sent to the Link 16 network as a J10.2 engagement status message.

As used herein and in the appended claims, the singular forms "a," "an," and "the" include plural referents unless the context clearly dictates otherwise.

One or more of the components, steps, features, and/or functions illustrated in the figures may be rearranged and/or combined into a single component, block, feature or function or embodied in several components, steps, or functions.

Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

What is claimed is:

1. A communication method comprising:
   receiving a plurality of messages in a first communication format from a first entity;
   transmitting a message in a second communication format to a second entity, wherein a content of the transmitted message and a timing of the transmission of the transmitted message are based on contents of the received plurality of messages and a difference between the first communication format and the second communication format;
   identifying information contained in the plurality of received messages to be persistently maintained;
   storing the identified information in a runtime storage; and
   for each received message:
      determining whether the received message includes an information request; and
      when an information request is included:
         obtaining persistently stored data from the runtime storage corresponding to the information request; and
         transmitting a response to the information request, the response including the obtained persistently stored data.

2. A communication method comprising:
   receiving a plurality of first messages in a first communication format from a first entity;
   transmitting a message in a second communication format to a second entity, wherein a content of the transmitted message and a timing of the transmission of the transmitted message are based on contents of the received plurality of messages and a difference between the first communication format and the second communication format;
   identifying information contained in the plurality of received messages to be persistently maintained;
   storing the identified information in a runtime storage;
   receiving a second message, the second message being in the second communication format;
   determining that the second message includes an information request;
   obtaining persistently stored data from the storage corresponding to the information request, the persistently stored data being from the plurality of messages in the first communication format; and
   transmitting a response to the information request as the transmitted message, the response including the obtained persistently stored data and being in the second communication format.

3. A communication method comprising:
   receiving a plurality of messages in a first communication format from a first entity;
   transmitting a message in a second communication format to a second entity, wherein a content of the transmitted message and a timing of the transmission of the transmitted message are based on contents of the received plurality of messages and a difference between the first communication format and the second communication format; and
   for each received message:
      identifying information contained in the received message to be persistently maintained;
      determining whether the received message includes an information request; and
      when the received message does not include an information request, determining whether the received message contains a command.

4. The method of claim 3, further comprising, for each received message:
   when the received message does not include a command, determining whether the received message contains a defined forwarding pathway; and
   when the received message includes a forwarding pathway, duplicating and forwarding the received message to the defined forwarding pathway.

5. The method of claim 1, wherein the transmitted message in the second communication format is a periodic status report.

6. The method of claim 1, wherein the transmitted message in the second communication format is a periodic status report and includes persistently stored data from the runtime storage, the persistently stored data being stored from the received plurality of messages in the first communication format.

7. The method of claim 1, wherein the first communication format is Variable Message Format (VMF) or Link 16, and the second communication format is the other of VMF and Link 16.

8. The method of claim 1, wherein the first and second entities are military entities.

9. The method of claim 1, wherein the transmitted response to the information request is in the second communication format.

10. The method of claim 2, wherein the transmitted message in the second communication format is a periodic status report.

11. The method of claim 2, wherein the transmitted message in the second communication format is a periodic status report and includes persistently stored data from the runtime storage, the persistently stored data being stored from the received plurality of messages in the first communication format.

12. The method of claim 2, wherein the first communication format is Variable Message Format (VMF) or Link 16, and the second communication format is the other of VMF and Link 16.

13. The method of claim 2, wherein the first and second entities are military entities.

14. The method of claim 2, further comprising:
determining that the second message is related to or an expansion of at least one of the plurality of first messages.

15. The method of claim 2, wherein the second message is received subsequent to at least one of the plurality of first messages.

16. The method of claim 3, wherein the transmitted message in the second communication format is a periodic status report.

17. The method of claim 3, wherein the transmitted message in the second communication format is a periodic status report and includes persistently stored data from the runtime storage, the persistently stored data being stored from the received plurality of messages in the first communication format.

18. The method of claim 3, wherein the first communication format is Variable Message Format (VMF) or Link 16, and the second communication format is the other of VMF and Link 16.

19. The method of claim 3, wherein the first and second entities are military entities.

* * * * *